No. 728,304. PATENTED MAY 19, 1903.
W. S. ROSS.
HARROW.
APPLICATION FILED MAY 27, 1902.
NO MODEL.

Witnesses:
E. C. Duffy
C. Hugh A. Duffy

Inventor
W. S. Ross,
per C. E. Duffy
Att'y

THE NORRIS PETERS CO., PHOTO-LITHO., WASHINGTON, D. C.

No. 728,304. Patented May 19, 1903.

UNITED STATES PATENT OFFICE.

WILLIAM S. ROSS, OF SALEM, ILLINOIS.

HARROW.

SPECIFICATION forming part of Letters Patent No. 728,304, dated May 19, 1903.

Application filed May 27, 1902. Serial No. 109,174. (No model.)

*To all whom it may concern:*

Be it known that I, WILLIAM S. ROSS, a citizen of the United States, residing at Salem, in the county of Marion and State of Illinois, have invented certain new and useful Improvements in Harrows; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to the class of harrows and diggers, and has for its object to provide a harrow which is simple in construction, cheap to manufacture, and composed of a minimum number of parts.

A further object of my invention is to provide a device of this class which will thoroughly pulverize the ground, either hard, soft, clay or sod.

A further object of my invention is to provide a harrow having teeth arranged so that they will not choke or clog up.

A further object of my invention is to provide a harrow of sections, any convenient number of which may be used in order to increase the area of ground to be covered.

A further object of my invention is to provide a harrow having its teeth arranged in gangs substantially at right angles to one another and sloped in opposite directions.

A further object of my invention is to provide a harrow having its teeth located in gangs and arranged so that they may be given any desired backward slant or rake in order to more thoroughly undercut the ground.

With all these objects in view my invention consists in the novel manner of arranging the harrow-teeth relatively.

My invention further consists in the novel manner of adjusting the harrow-teeth.

My invention further consists in certain other novel features of construction and in combination of parts, which will be first fully described and afterward specifically pointed out in the appended claims.

Figure 1:
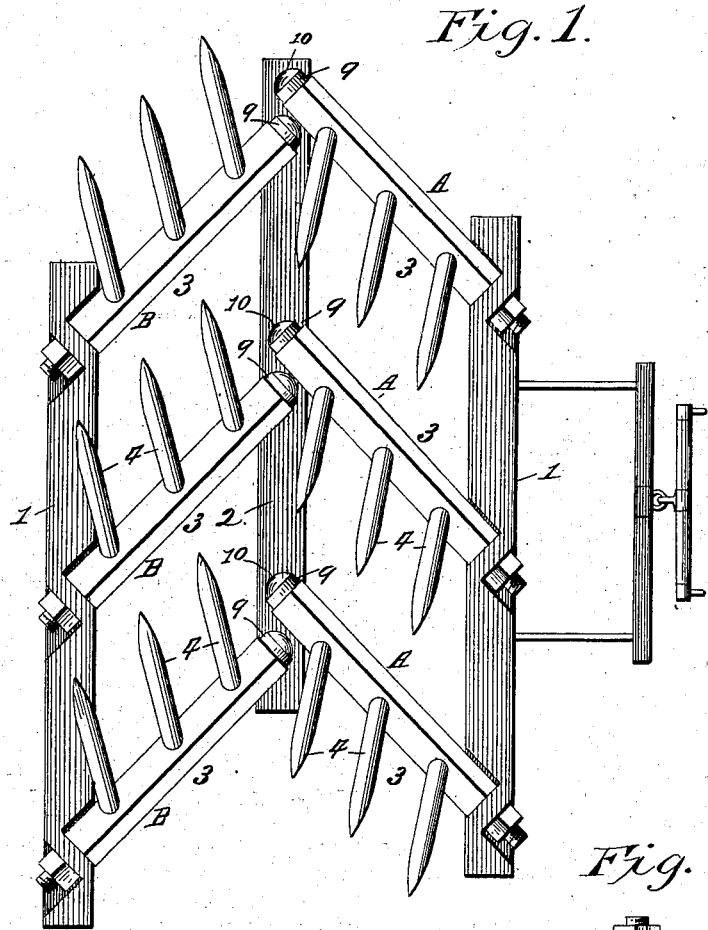
Figure 2:
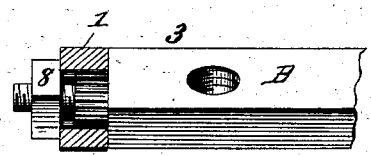
Figure 3:
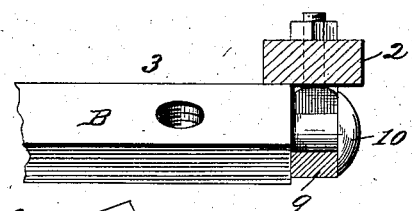
Figure 4:
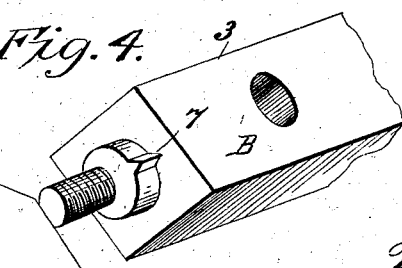

Referring to the accompanying drawings, Figure 1 is an inverted plan view showing each gang of teeth independently adjustable. Fig. 2 is a fragmentary view, partly in section, of a portion of one of the teeth-carrying bars and means for holding the same in the desired position in the frame. Fig. 3 is a fragmentary view, partly in section, of the opposite end portion of one of the teeth-carrying bars, showing means for securing the same to the frame. Fig. 4 is a fragmentary perspective view of a portion of one of the teeth-carrying bars and a portion of the frame, showing same in position to be secured together.

Like characters of reference indicate the same parts throughout the several figures, in which—

1 indicates the forward and rear frame-pieces, and 2 the central frame-piece.

3 indicates the teeth-carrying bars, arranged substantially at right angles, as shown in Fig. 1, the front and rear portions of which are slanted in opposite directions, as shown in Fig. 1.

4 indicates the teeth secured in the teeth-carrying bars 3, the teeth on the forward and rear bars slanting in opposite directions laterally and backwardly. The teeth-carrying bars are formed of two independent sections A and B, but are capable of being revolved so as to give the teeth any slant desired, or the teeth may be held vertically, as is the case in the majority of harrows. I attain this object by providing the forward and rear frame-pieces 1 with circular holes or openings 6, provided with a series of notches 6', as shown in Fig. 4, said holes being of course arranged in line with the teeth-carrying bars 3. I swage one end of said bars with a V-shaped key thereon, as shown at 7, the extreme end being threaded. It of course is obvious that when the key portion 7 is inserted in the notched opening 6 the teeth-carrying bars are securely held from any rotary movement. When it is desired, therefore, to change the slant of the harrow-teeth, the nuts 8 are unthreaded off the teeth-carrying bars 3 and the front and rear frame-pieces 1 are detached. The said bars are then set at the desired angle and the frame-pieces 1 again attached, the keys of the said bars entering the notched openings in the frame-pieces, and as the said teeth-carrying bars cannot then turn the teeth are securely held at the desired slant. This means of adjusting and securing the teeth-carrying bars is one of many that may be emyloyed, and I do not wish to be understood as limiting myself in this particular, but consider myself entitled to use any simple means which will give the desired result.

The central frame-piece 2 carries the rear ends of the sections A and the forward ends of the sections B. I simply employ clips 9, secured in said central frame-piece, and provide the ends of the teeth-carrying bars with a head 10, so that the said bars may readily turn when being adjusted at their opposite ends. Thus it will be seen that I have in a simple manner constructed a harrow which is extremely strong and durable and which may be constructed, if desired, so that the teeth may be adjusted to different slants, although the adjustable feature above described may be altogether omitted.

What I claim as new, and desire to secure by Letters Patent of the United States, is—

1. In a harrow, the combination with the frame-pieces, provided with openings therein having a series of notches, teeth-carrying bars, a key thereon adapted to engage said notches substantially as described.

2. In a harrow the combination with the frame-pieces provided with openings therein, having a series of notches therein, teeth-carrying bars, means therein for engaging said notches substantially as described.

In testimony whereof I affix my signature in presence of two witnesses.

WILLIAM S. ROSS.

Witnesses:
 D. D. HAYNIE,
 WILL A. MILLS.